(12) United States Patent  
Morizono

(10) Patent No.: US 11,339,983 B2
(45) Date of Patent: May 24, 2022

(54) AIR CONDITIONER

(71) Applicant: TOSHIBA MITSUBISHI-ELECTRIC INDUSTRIAL SYSTEMS CORPORATION, Chuo-ku (JP)

(72) Inventor: Yasushi Morizono, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 187 days.

(21) Appl. No.: 16/629,870

(22) PCT Filed: Sep. 21, 2017

(86) PCT No.: PCT/JP2017/034084
§ 371 (c)(1),
(2) Date: Jan. 9, 2020

(87) PCT Pub. No.: WO2019/058480
PCT Pub. Date: Mar. 28, 2019

(65) Prior Publication Data
US 2020/0208855 A1 Jul. 2, 2020

(51) Int. Cl.
*F24F 6/14* (2006.01)
*F24F 3/02* (2006.01)
(Continued)

(52) U.S. Cl.
CPC ............ *F24F 6/14* (2013.01); *B01F 23/2132* (2022.01); *F24F 3/02* (2013.01)

(58) Field of Classification Search
CPC ....... F24F 6/14; F24F 3/02; B01F 3/04; B01F 23/2132
See application file for complete search history.

(56) References Cited

U.S. PATENT DOCUMENTS 5,387,376 A * 2/1995 Gasser .................. F24F 6/12
261/78.2

FOREIGN PATENT DOCUMENTS

JP 2-41023 U 3/1990
JP 8-5113 A 1/1996
(Continued)

OTHER PUBLICATIONS

Combined Chinese Office Action and Search Report dated Nov. 27, 2020, in Chinese Patent Application No. 201780094014.6 (with English translation), citing document AO therein, 15 pages.
(Continued)

*Primary Examiner* — Robert A Hopkins
(74) *Attorney, Agent, or Firm* — Oblon, McClelland, Maier & Neustadt, L.L.P.

(57) ABSTRACT

An air conditioner includes a flow path through which air to be humidified flows, an agitating plate group, and a spray nozzle. The agitating plate group is configured by arranging agitating plates in parallel at intervals over an entire cross-section of the flow path. Each of the agitating plates has a plate width adjusted to cause a vortex downstream. The spray nozzle is disposed immediately downstream of the agitating plate group, and sprays water particles in a direction perpendicular to a flow direction of the flow path. The plate width of each of the agitating plates is adjusted to satisfy a range of a Reynolds number causing a Karman vortex within a range of used wind speeds. The air conditioner provides high humidification efficiency and high saturation efficiency.

7 Claims, 11 Drawing Sheets

(51) Int. Cl.
*B01F 23/21* (2022.01)
*B01F 23/213* (2022.01)

(56) References Cited

FOREIGN PATENT DOCUMENTS

| | | |
|---|---|---|
| JP | 2001-235194 A | 8/2001 |
| JP | 2003-50027 A | 2/2003 |
| JP | 2012-229855 A | 11/2012 |
| JP | 2014-211304 A | 11/2014 |
| JP | 2016-217560 A | 12/2016 |

OTHER PUBLICATIONS

Japanese Office Action dated Dec. 22, 2020 in Japanese Patent Application No. 2019-542889 (with unedited computer-generated English translation), 9 pages.

Office Action dated May 11, 2021 in corresponding Chinese Patent Application No. 201780094014.6 (with English Translation), 13 pages.

International Search Report dated Dec. 12, 2017 in PCT/JP2017/034684 filed Sep. 21, 2017, citing documents AP and AR-AT therein, 2 pages.

\* cited by examiner

|  | WITHOUT AGITATING PLATE GROUP (FIG. 4) | WITH AGITATING PLATE GROUP CAUSING KARMAN VORTEX (FIG. 3) |
|---|---|---|
| INLET TEMPERATURE | 33.6 °CDB | 33.7 °CDB |
| HUMIDITY | 60.4 %RH | 59.7 %RH |
| OUTLET (UPPER PART) TEMPERATURE | 31.3 °CDB | 31.7 °CDB |
| HUMIDITY | 70.5 %RH | 69.5 %RH |
| OUTLET (LOWER PART) TEMPERATURE | 30.3 °CDB | 31.6 °CDB |
| HUMIDITY | 74.6 %RH | 69.1 %RH |
| DIFFERENCE BETWEEN UPPER PART AND LOWER PART OF OUTLET TEMPERATURE | 1.0 °CDB | 0.1 °CDB |
| HUMIDITY | 4.1 %RH | 0.4 %RH |
| EVAPORATION DISTANCE | 2.0 m OR MORE (OUT OF MEASUREMENT RANGE) | 1.3 m |

FIG. 6

AIR CONDITIONER

FIELD

The present invention relates to an air conditioner in which a spray nozzle is disposed in a flow path of air to be humidified, and the air is humidified by spray of water particles from the spray nozzle.

BACKGROUND

Meanings of terms in the present specification are as follows.

"Scattering": unvaporized water particles that have been sprayed from a spray nozzle scatter in the air.

"Diffusion": water molecules are evaporated from surfaces of water particles by thermal motion.

"Agitation": air around water particles is disturbed to exchange the air around the water particles high in humidity due to moisture vaporized from the water particles, with air having low humidity therearound, thereby enhancing humidity gradient around the water particles. This promotes evaporation as compared with evaporation from surfaces of the water particles in a stationary state by simple diffusion phenomenon.

Various apparatuses relating to an air conditioning machine and an air conditioner in which a spray nozzle is disposed inside an air flow path (wind tunnel) such as a duct thereof, and the air is humidified by water spray from the spray nozzle have been proposed.

Ideal requirements of the air conditioner that sprays water or steam to humidify the air include the following elements.

a) water particles are scattered over airflow.

b) air around water particles is agitated to maintain high humidity gradient, and diffusion phenomenon is promoted.

c) wetting inside a flow path is prevented.

d) air in the entire flow path including corners is agitated, and deterioration of humidity gradient around the water particles and deterioration of evaporation speed due to relative humidity rise within a water particle scattering range are avoided. The water particle scattering range indicates a range inside the airflow to which the water particles sprayed into the airflow can physically reach.

A status of response to the elements a) to d) by each of existing technologies is described.

PTL 1 (JP H2-41023 U) discloses a humidifier with a heater. The humidifier includes a large number of nozzles directed to a flow direction of a duct.

a) Scattering Property: Not Good

Scattering property can be enhanced by increasing the number of nozzles. However, steam is sprayed toward a mass of saturated steam because the steam is sprayed to a leeward side, and spray energy is not effectively used in scattering and agitation.

b) Agitation Property: Bad

Agitation property is not considered, and performance is varied depending on surrounding wind speed and a dimension of a duct.

c) Wetting: Not Good

Wetting of a nozzle and a header can be prevented by the heater. However, a system for providing the heater is complicated. Further, wetting on a downstream side of the nozzle is not considered, and a long evaporation distance is necessary in a case of humidification under a high saturation efficiency condition.

d) Humidification at Corner: Bad

Humidification at a corner is not considered. Therefore, it is necessary to secure a long evaporation distance in order to secure a time necessary for mixing the air at the corner, or it is necessary to lower a target relative humidity.

PTL 2 (JP 2003-050027 A) discloses a humidifier with a nozzle that sprays steam toward a diffusion box on windward side.

a) Scattering Property: Not Good

Steam is sprayed toward a mass of saturated steam because the steam is sprayed toward the windward side, and spray energy is not effectively used in scattering and agitation. In addition, a paragraph 0008 in the specification recites that the diffusion box captures the unvaporized steam, and the humidifier focuses on suppression of wetting rather than humidification efficiency.

b) Agitation Property: Not Good

The humidification object air is agitated by turbulence generated around the diffusion box; however, a method of determining a dimension of the diffusion box with respect to wind speed is not described. It is premised that a ready-made humidifier is used within a range of wind speed where effectivity has been confirmed by a factory test or the like. Therefore, the ready-made humidifier cannot be applied to a case where a dimension of the ready-made humidifier is not matched with installation environment.

c) Wetting: Not Good

The agitation property and the diffusion property are insufficient. Therefore, in a case where humidification with high saturation efficiency is performed, a partial steam-saturated region is generated and wetting is highly possibly generated.

d) Humidification at Corner: Bad

Humidification at a corner is not considered. Therefore, it is necessary to secure a long evaporation distance in order to secure a time necessary for mixing the air at the corner, or it is necessary to lower target relative humidity.

PTL 3 (JP 2012-229855 A) discloses a humidifier with a nozzle that sprays water toward a diffusion plate on a windward side.

a) Scattering Property: Not Good

A spray direction of the nozzle is inclined to the windward direction. Therefore, energy in the windward direction out of spray energy is not used in scattering.

b) Agitation Property: Not Good

The humidification object air is agitated by turbulence generated around the diffusion plate; however, a method of determining a dimension of the diffusion plate with respect to wind speed is not described.

c) Wetting: Not Good

The agitation property and the diffusion property are insufficient. Therefore, in a case where humidification with high saturation efficiency is performed, a partial steam-saturated region is generated and wetting is highly possibly generated.

d) Humidification at Corner: Bad

Humidification at a corner is not considered. Therefore, it is necessary to secure a long evaporation distance in order to secure a time necessary for mixing the air at the corner, or it is necessary to lower target relative humidity.

CITATION LIST

Patent Literature

[PTL 1] JP H2-41023 U
[PTL 2] JP 2003-050027 A
[PTL 3] JP 2012-229855 A

SUMMARY

Technical Problem

In these technologies, scattering and diffusion of the spray are achieved by paying attention to the visible spray; however, any of the above-described humidifiers does not satisfy all of the elements a) to d), and unevenness of temperature and humidity inside the flow path occurs. Accordingly, humidification efficiency (ratio of water to be vaporized of the sprayed water) and saturation efficiency (index representing humidity raising capability determined from final attainment humidity) are insufficient.

As a result of intensive studies, the inventors of the present application found that, instead of paying attention to the visible spray, agitation of the air in the entire flow path by forced convection (convection by external force) is important to enhance humidification efficiency and saturation efficiency, and spraying water particles to a field where the air in the entire flow path is agitated considerably improves uniformity of the temperature and humidity inside the flow path.

The present invention is made to solve the above-described issues, and an object of the present invention is to provide an air conditioner with high humidification efficiency and high saturation efficiency.

Solution to Problem

To achieve the above-described object, an air conditioner according to the present invention includes a flow path through which air to be humidified (humidification object air) flows, and an agitating plate group and a spray nozzle that are configured as follows.

The agitating plate group is configured by arranging agitating plates in parallel at intervals over an entire cross-section of the flow path. Each of the agitating plates has a plate width adjusted to cause a vortex flow downstream. The plate width of each of the agitating plates is adjusted to satisfy a range of a Reynolds number causing a Karman vortex within a range of used wind speeds. Preferably, the plate width of each of the agitating plates is adjusted to correspond to an upper limit of the range of the Reynolds number, at a maximum wind speed within the range of used wind speeds. Preferably, the plate width of each of the agitating plates is changeable.

The spray nozzle is disposed immediately downstream of the agitating plate group, and sprays water particles in a direction perpendicular to a flow direction of the flow path. Preferably, the spray nozzle sprays the water particles with spray force at which a spray range covers a plurality of agitating plates of the agitating plate group as viewed in the flow direction of the flow path.

With this configuration, an agitation region where the air (humidification object air) in the entire flow path on the downstream side of the agitating plate group is agitated by the vortex flow generated downstream of each of the agitating plates is formed. The water particles sprayed in the direction perpendicular to the flow direction of the flow path are efficiently scattered by the spray force and the plurality of vortex flows. Forced convection in the agitation region that is a field of a plurality of Karman vortex streets (Karman vortexes) promotes agitation of the scattered water particles and the humidification object air, and promotes diffusion. More specifically, when the air in the entire flow path is agitated, a mass of the air having high humidity generated around the water particles is exchanged with the air having low humidity therearound, high humidity gradient is maintained, and evaporation of surfaces of the water particles is promoted. Further, since the agitation region is formed over the entire flow path, temperature and humidity of the entire flow path can be uniformized promptly even when a spraying position is biased. Further, the agitating plate group can agitate the air in the entire flow path at low cost without a power source.

Further, in a case where the spray nozzle sprays water, the spray nozzle preferably sprays the water vertically downward. The gravity acting on the water particles, motion energy by the spray force, and downwardly-moving force of the air that has large specific gravity due to vaporization of water and reduction of the temperature are directed in the same direction, which enhances scattering force of the water particles. Accordingly, it is possible to reduce the number of spraying positions and the number of nozzles as compared with an existing humidifier.

Further, in a case where the spray nozzle sprays steam, the spray nozzle preferably sprays the steam vertically upward. The motion energy by the spray force and the upwardly-moving force of the air that is high in temperature and is light in specific gravity are directed in the same direction, which enhances scattering force of the water particles.

The air conditioner according to the present embodiment satisfies the above-described elements a) to d) in the following manner.

a) Scattering Property: Good

Since the water particles are sprayed in the direction perpendicular to the flow direction of the flow path, the water particles are efficiently scattered by the spray force and the plurality of vortex flows. In the case of water, when the water is sprayed vertically downward, the gravity, the motion energy by the spray force, and the downwardly-moving force of the air that has large specific gravity due to vaporization of water and reduction of the temperature are directed in the same direction, and the energy can be used for scattering. In the case of steam, when the steam is sprayed vertically upward, the motion energy by the spray force and the upwardly-moving force of the air that is high in temperature and is light in specific gravity are directed in the same direction, and the energy can be used for scattering.

b) Agitation Property: Very Good

Since the agitation energy maximally utilizes the energy of the vortexes generated from the airflow, it is possible to simultaneously achieve high diffusion property and high agitation property that are not achievable only by spraying. As compared with the case without agitation, high humidity gradient surrounded by the air having low humidity is maintained around the water particles by the agitation effect derived from the vortexes, and evaporation on the surfaces of the water particles is promoted. Further, since the agitation region is formed over the entire duct, temperature and humidity are promptly uniformized over the entire flow path even when a spraying position is biased.

c) Wetting: Very Good

Since diffusion and agitation are sufficiently performed, a supersaturation region is hardly generated, and wetting hardly occurs even when humidification with high saturation efficiency is performed. Even if wetting occurs, temperature and humidity of the entire flow path are constantly uniformized in the agitation region by the vortex flows. Therefore, wetting is hardly continued.

d) Humidification at Corner: Very Good

Since diffusion and agitation are sufficiently performed, uniform humidification up to corners can be performed.

Advantageous Effects of Invention

According to the air conditioner of the present invention, the air in the entire flow path is agitated and partial unevenness of temperature and humidity is eliminated. This makes it possible to achieve high humidification efficiency and high saturation efficiency.

BRIEF DESCRIPTION OF DRAWINGS

FIG. 6 is a diagram illustrating test data relating to presence/absence of an agitating plate group.

DESCRIPTION OF EMBODIMENTS

Figure 1:
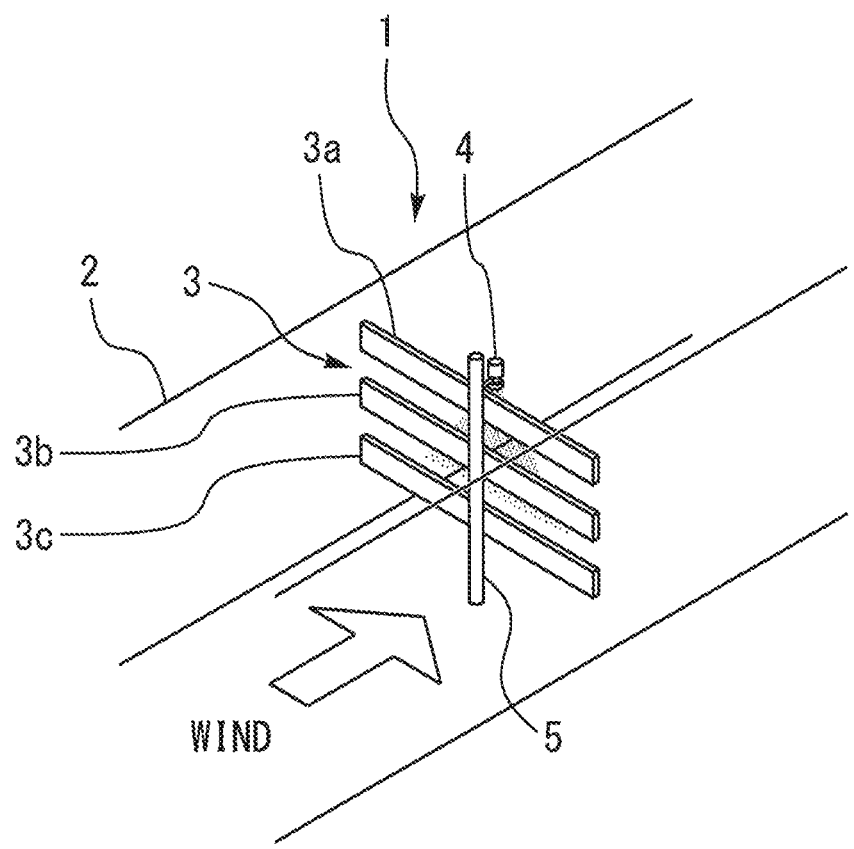
FIG. 1 is a perspective view of an air conditioner according to Embodiment 1.

Some embodiments of the present invention are described in detail below with reference to drawings. Note that elements common to the drawings are denoted by the same reference numerals and repetitive description is omitted.

Embodiment 1

FIG. 1 is a perspective view of an air conditioner 1 according to Embodiment 1. The air conditioner 1 includes a square-cylindrical duct 2 that is a flow path (wind tunnel) through which air to be humidified flows. Because of limitation of an installation space, a flow path length usable for humidification is small, and it is necessary to evaporate water particles in a short distance (in short time). Therefore, the air conditioner 1 according to the present embodiment includes an agitating plate group 3 and a spray nozzle 4 described below. Note that an eliminator (not illustrated) that removes water drops accompanying flow of the air may be disposed in the most downstream part of the duct 2.

(Agitating Plate Group)

The agitating plate group 3 is described with reference to FIG. 1 to FIG. 3. Since the flow path length useable for humidification is small as described above, the agitating plate group 3 is provided on the most upstream of the duct 2. The agitating plate group 3 includes a plurality of agitating plates each having a length close to a duct width, and each of the agitating plates has a plate width adjusted to cause a vortex flow downstream. The agitating plate group 3 is configured by arranging the agitating plates in parallel at intervals over an entire cross-section of the duct 2. Here, the cross-section of the duct 2 is a flow path cross-section perpendicular to a flow direction of the flow path. The intervals are regular intervals including, for example, equal intervals.

The agitating plate group 3 illustrated in FIG. 1 is configured by arranging three agitating plates (first agitating plate 3a, second agitating plate 3b, and third agitating plate 3c) with equal intervals. Note that a gap is provided between the first agitating plate 3a on the uppermost stage and a ceiling surface of the duct 2 and between the third agitating plate 3c on the lowermost stage and a bottom surface of the duct 2. This facilitates agitation of the air at corners of the duct 2.

Next, adjustment of the plate width of each of the agitating plates causing a vortex flow is described. One of indices representing features of the flow is a Reynolds number. The Reynolds number (Re) is represented by the following expression (1) when a size of an object (plate width of agitating plate) placed on flow is denoted by D [m], flow velocity is denoted by U [m/s], and a kinematic viscosity coefficient (physical property value representing viscosity; $15.4 \times 10^{-6}$ [m$^2$/s] at 25° C. and 1 atmospheric pressure in case of air) of fluid is denoted by v [m$^2$/s].

[Math. 1]

$$Re = \frac{DU}{v} \quad (1)$$

Figure 2:
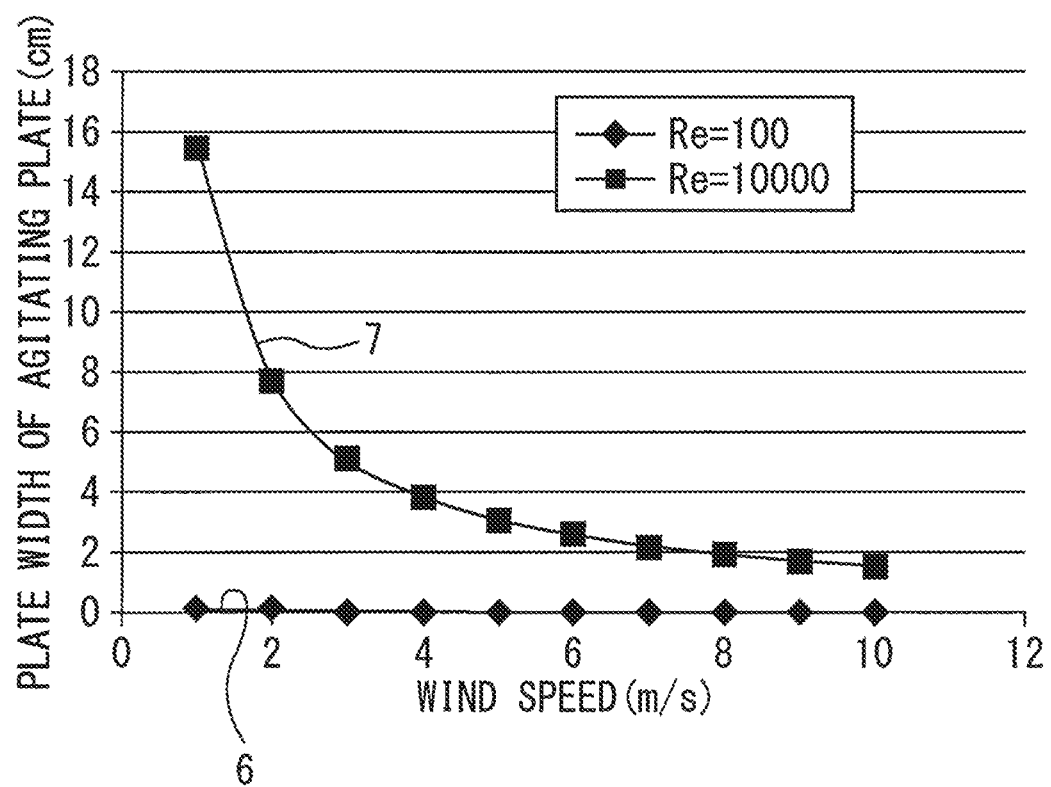
FIG. 2 is a graph illustrating a plate width range of an agitating plate causing a Karman vortex, at each wind speed.

When a generation range of a Karman vortex is set to $10^2 < Re < 10^4$, a dimension of the plate width at which the Re becomes $10^2$ and a dimension of the plate width at which the Reynolds number Re becomes $10^4$ with respect to the flow velocity U [m/s] are displayed in FIG. 2. FIG. 2 is a graph illustrating the plate width range of the agitating plate causing the Karman vortex, at each wind speed.

In FIG. 2, a plate width between the Reynolds number Re of $10^2$ (solid line 6) and the Reynolds number Re of $10^4$ (solid line 7) is a plate width causing the Karman vortex. An appropriate plate width of the agitating plate in an actual air conditioner is calculated using FIG. 2. In a case where a range of used wind speeds as an application condition is 2 m/s to 4 m/s, the plate width range of the agitating plate causing the Karman vortex is 0.1 cm to 7.7 cm at the wind speed of 2 m/s, and 0.1 cm to 3.9 cm at the wind speed of 4 m/s. The energy of the vortex becomes larger as a size of the vortex is larger. Therefore, in the case of this application condition (range of used wind speeds), the agitating plate having the plate width of 3.9 cm is desirably selected.

As described above, the plate width of each of the agitating plates is adjusted so as to satisfy the range of the Reynolds number causing the Karman vortex within the range of used wind speeds. Preferably, the plate width of each of the agitating plates is adjusted so as to correspond to an upper limit of the range of the Reynolds number at the maximum wind speed within the range of the used wind speed.

Figure 3:
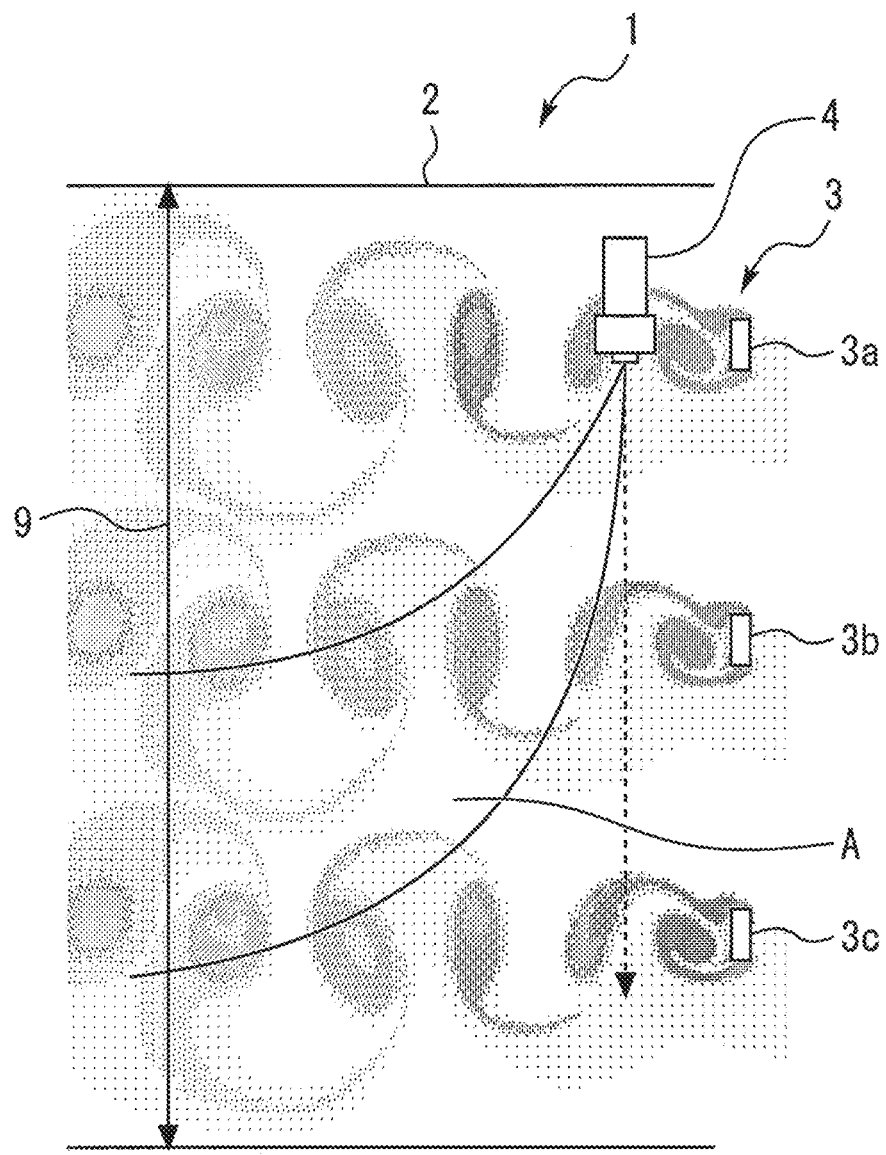
FIG. 3 is a side view of the air conditioner according to Embodiment 1.

As illustrated in FIG. 3, Karman vortexes can be intentionally generated by providing the agitating plates adjusted in the above-described manner. Further, an agitation region where the air (humidification object air) in the entire flow path on the downstream side of the agitating plate group 3 is agitated is formed by providing the agitating plates with predetermined intervals over the entire flow path. Further, using the agitating plate group 3 can agitate the air in the entire flow path at low cost without a power source.

(Spray Nozzle)

Next, the spray nozzle 4 is described with reference to FIG. 3. In FIG. 3, a right side corresponds to a windward side, and a left side corresponds to a leeward side. The spray nozzle 4 is disposed immediately downstream of the agitating plate group 3, and sprays water particles in a direction perpendicular to the flow direction of the duct 2. Preferably, the spray nozzle 4 sprays water particles with spray force at which a spray range A covers the plurality of agitating plates (second agitating plate 3b and third agitating plate 3c) of the agitating plate group 3 as viewed in the flow direction of the duct 2. The "perpendicular direction" may include not only that a center axis of the spray is coincident with the perpendicular direction but also that a part of a fan-shaped or cone-shaped spray shape includes the perpendicular direction. For example, the spray direction is inclined to the downstream side based on the range of the used wind speed in order to prevent the spray from reaching the bottom surface, in some cases.

As illustrated in FIG. 3, the water particles sprayed in the direction perpendicular to the flow direction of the flow path are efficiently scattered by spray force and a plurality of vortex flows. Forced convection in the agitation region that is a field of a plurality of Karman vortex streets (Karman vortexes) promotes agitation of the scattered water particles and the humidification object air, and promotes diffusion (water particle scattering/agitation range 9). More specifically, when the air in the entire flow path is agitated, a mass of the air having high humidity generated around the water particles is exchanged with the air having low humidity therearound, high humidity gradient is maintained, and evaporation on surfaces of the water particles is promoted. Further, since the agitation region is formed over the entire flow path, temperature and humidity of the entire flow path can be uniformized promptly even when a spraying position is biased.

In the example illustrated in FIG. 1 and FIG. 3, the duct 2 is horizontally provided. The spray nozzle 4 is a two-fluid nozzle that sprays and atomizes two fluids of air and water, and the spray nozzle 4 sprays the air and the water vertically downward. A fluid supply pipe 5 supplies the air and the water to the spray nozzle 4.

When the air and the water are sprayed vertically downward, the gravity acting on the water particles, motion energy by the spray force, and downwardly-moving force of the air that has large specific gravity due to vaporization of water and reduction of the temperature are directed in the same direction. This enhances scattering force of the water particles.

(Comparison Object)

Figure 4:
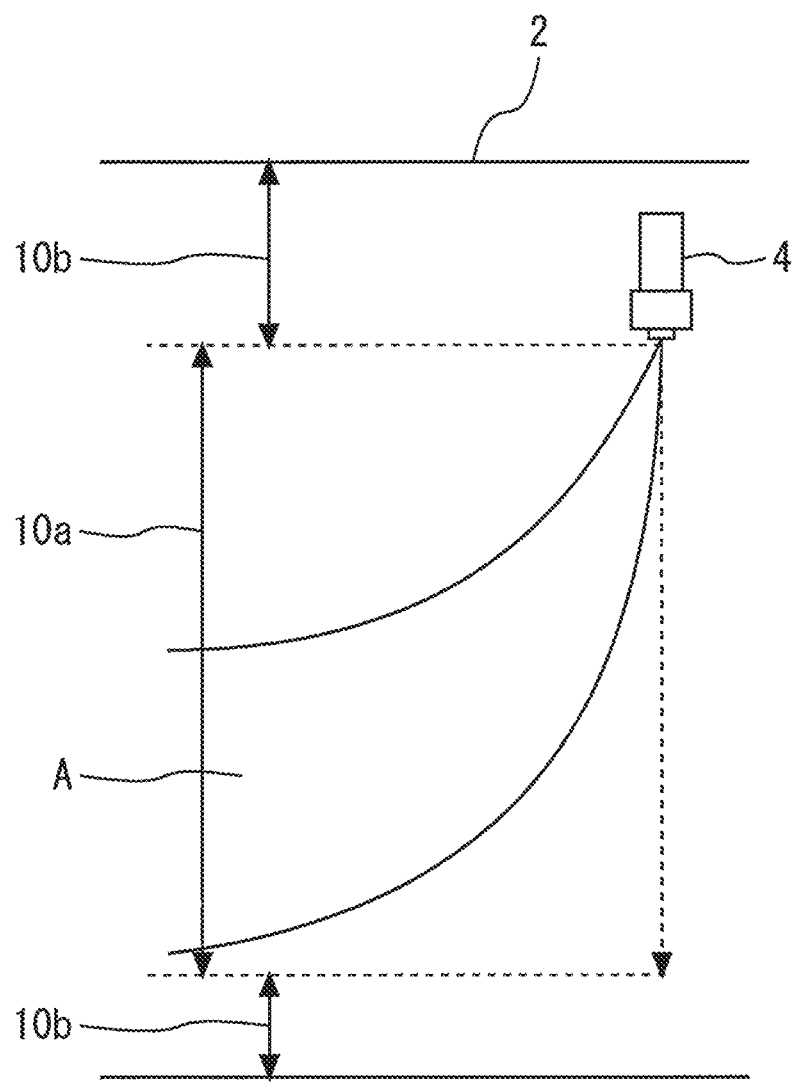
FIG. 4 is a diagram illustrating a first comparison object.
Figure 5:
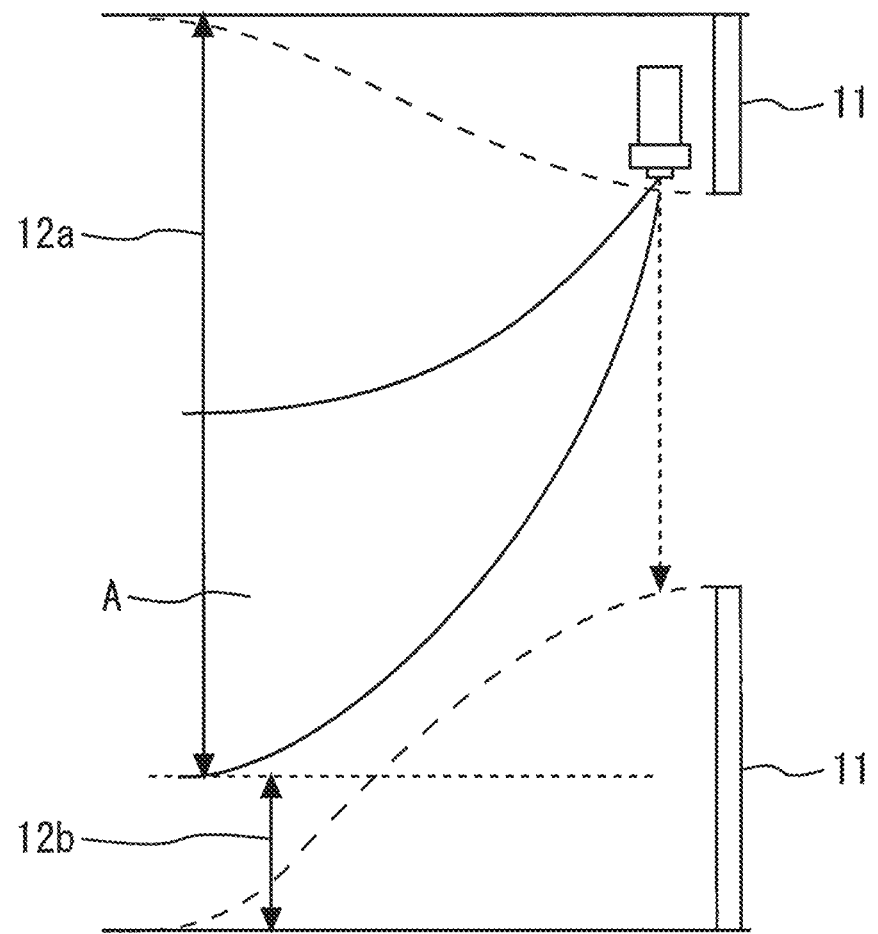
FIG. 5 is a diagram illustrating a second comparison object.

Next, a configuration not including the agitating plate group 3 is described as a comparison object with reference to FIG. 4 (normal spray) and FIG. 5 (adoption of throttle plate). As illustrated in FIG. 4, in a case where water particles are simply sprayed from the spray nozzle 4 inside the duct 2, airflow around the water particles scattered by the spray force becomes close to laminar flow. Therefore, evaporation of the water particles relies only on molecular diffusion force. The air within a water particle non-scattering range 10b outside a water particle scattering range 10a by the normal spray is humidified mainly by diffusion phenomenon by concentration gradient of the vaporized water particles. Therefore, unevenness of temperature and humidity occurs inside the duct 2.

In a case where a throttle plate 11 is erected on each of the ceiling surface and the bottom surface as illustrated in FIG. 5, the water particles are intensively sprayed to a limited opening, which enhances scattering property. Therefore, a water particle scattering range 12a becomes wider than the water particle scattering range 10a of FIG. 4. The air within a water particle non-scattering range 12b outside the water particle scattering range 10a, however, is humidified only by diffusion phenomenon by concentration gradient of the vaporized water molecules. Therefore, unevenness of temperature and humidity occurs inside the duct 2 as with FIG. 4.

In the case of the molecular diffusion, a moving distance of the water molecules is increased in proportion to a square root of a time (FIG. 4 and FIG. 5). In contrast, in the case of the forced convection by the agitating plate group 3, the moving distance of the water particles is increased in proportion to a time. Therefore, the convection is a dominant factor of an evaporation time, which allows for evaporation in a short time (FIG. 3).

(Test Data)

FIG. 6 illustrates test data of the configuration of FIG. 4 (without agitating plate group 3) and test data of the configuration of FIG. 3 (with agitating plate group 3). A test condition is a wind speed of 4.0 m/s, a spray amount of 52 ml/min, and a duct dimension of 500 mm×500 mm. Further, in the agitating plate group 3 of FIG. 3, the agitating plate width is 3.9 cm, and a plate arrangement pitch is 10 cm.

According to the configuration including the agitating plate group 3 illustrated in FIG. 3, temperature difference between an upper part and a lower part of a duct outlet is 0.1° CDB, humidity difference therebetween is 0.4% RH, and an evaporation distance (wetting avoidance distance) is 1.3 m. As is obvious from the test data, as compared with the configuration not including the agitating plate group 3 illustrated in FIG. 4, unevenness of temperature and humidity between the upper part and the lower part of the duct outlet is small, and the evaporation distance is largely improved.

As described above, according to the air conditioner 1 of the present embodiment, the air in the entire flow path is agitated, and partial unevenness of temperature and humidity is eliminated. As a result, it is possible to avoid insufficient humidification caused by unevenness, generation of wetting caused by humidity saturation, and control failure, and to achieve high humidification efficiency and high saturation efficiency.

Further, sanitary humidification that satisfies the above-described ideal requirements of the air conditioner, is small in the evaporation distance (evaporation time), does not cause wetting inside the flow path, and has no waste in sprayed water (steam) can be achieved. Since the number of parts is small and the configuration is simple, the plate width adjustment, etc. corresponding to the duct dimension and the wind speed at an installation place can be easily performed, which allows for wide application.

Modification

In Embodiment 1 described above, the example in which the water particles are sprayed vertically downward has been described; however, the spray direction is not limited thereto. It is sufficient to spray the water particles perpendicularly to the flow direction of the flow path. For example, in a case where the flow path is formed in a vertical direction, the water particles are sprayed in a lateral direction (width direction or radial direction) of the flow path. Note that this is true of the following embodiments.

Further, in Embodiment 1 described above, the generation range of the Karman vortex is set to $10^2 < Re < 10^4$; however, this is one guide and does not preclude the range of the Reynolds number causing the Karman vortex from being set to the other numerical range.

Figure 7:
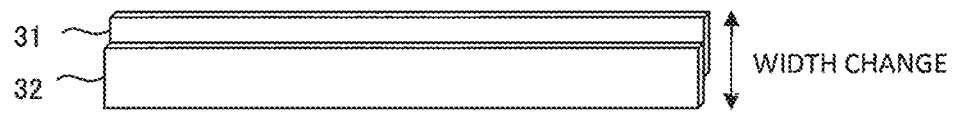
FIG. 7 is a diagram illustrating an example of a configuration in which a plate width of the agitating plate is changeable.

Further, in the air conditioner 1 according to Embodiment 1 described above, the plate width of each of the agitating plates is desirably changeable. For example, as illustrated in FIG. 7, two plates (31 and 32) may be superimposed to configure an agitating plate, and the plate width may be changed by sliding the two plates. Alternatively, the plate width may be changed by replacing the agitating plate. Note that this is true of the following embodiments.

Figure 8:
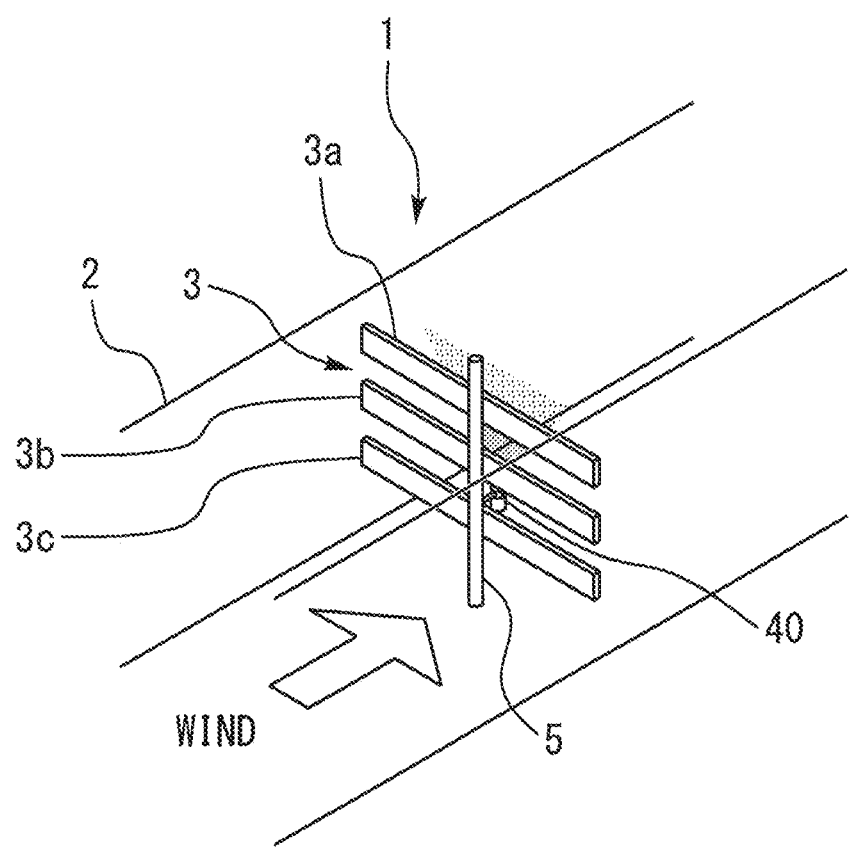
FIG. 8 is a perspective view of the air conditioner provided with a steam spray nozzle.

Further, in the air conditioner 1 according to Embodiment 1 described above, the two-fluid nozzle is used as the spray nozzle 4 that sprays the air and the water. Alternatively, a one-fluid nozzle that sprays only water may be used. Further, in place of the spray nozzle 4, a steam spray nozzle 40 that sprays steam may be used. FIG. 8 is a perspective view of the air conditioner 1 provided with the steam spray nozzle 40. As illustrated in FIG. 8, the steam spray nozzle 40 sprays steam vertically upward. Temperature and pressure of the sprayed steam are instantly lowered to temperature and pressure of external air. Therefore, the sprayed steam is condensed to water particles (particle diameter is smaller than particle diameter of sprayed water because of condensation). The motion energy by the spray force and upwardly-moving force of the air that is high in temperature and is light in specific gravity are directed to the same direction, which enhances scattering force of the water particles. Note that this is true of the following embodiments.

Further, in the air conditioner 1 according to Embodiment 1 described above, each of the agitating plates may be a perforated plate, for example, a punching metal that has a large number of holes formed by performing punching on a metal plate. Using the perforated plate makes it possible to prevent wetting of a shielding plate caused by swirl of the vortex. Note that this is true of the following embodiments.

Further, the humidification object air of the air conditioner 1 according to Embodiment 1 described above may be internal air and external air. Further, a use place of the air conditioner 1 may be indoor or outdoor place. Moreover, the air conditioner 1 includes not only a humidifier but also a cooling apparatus that uses vaporization heat along with humidification for cooling. Note that this is true of the following embodiments.

Embodiment 2

Next, Embodiment 2 according to the present invention is described with reference to FIG. 9 and FIG. 10. In Embodiment 1 described above, the air conditioner including one spray nozzle 4 has been described. In Embodiment 2, an air conditioner including a plurality of spray nozzles is exemplified.

Figure 9:
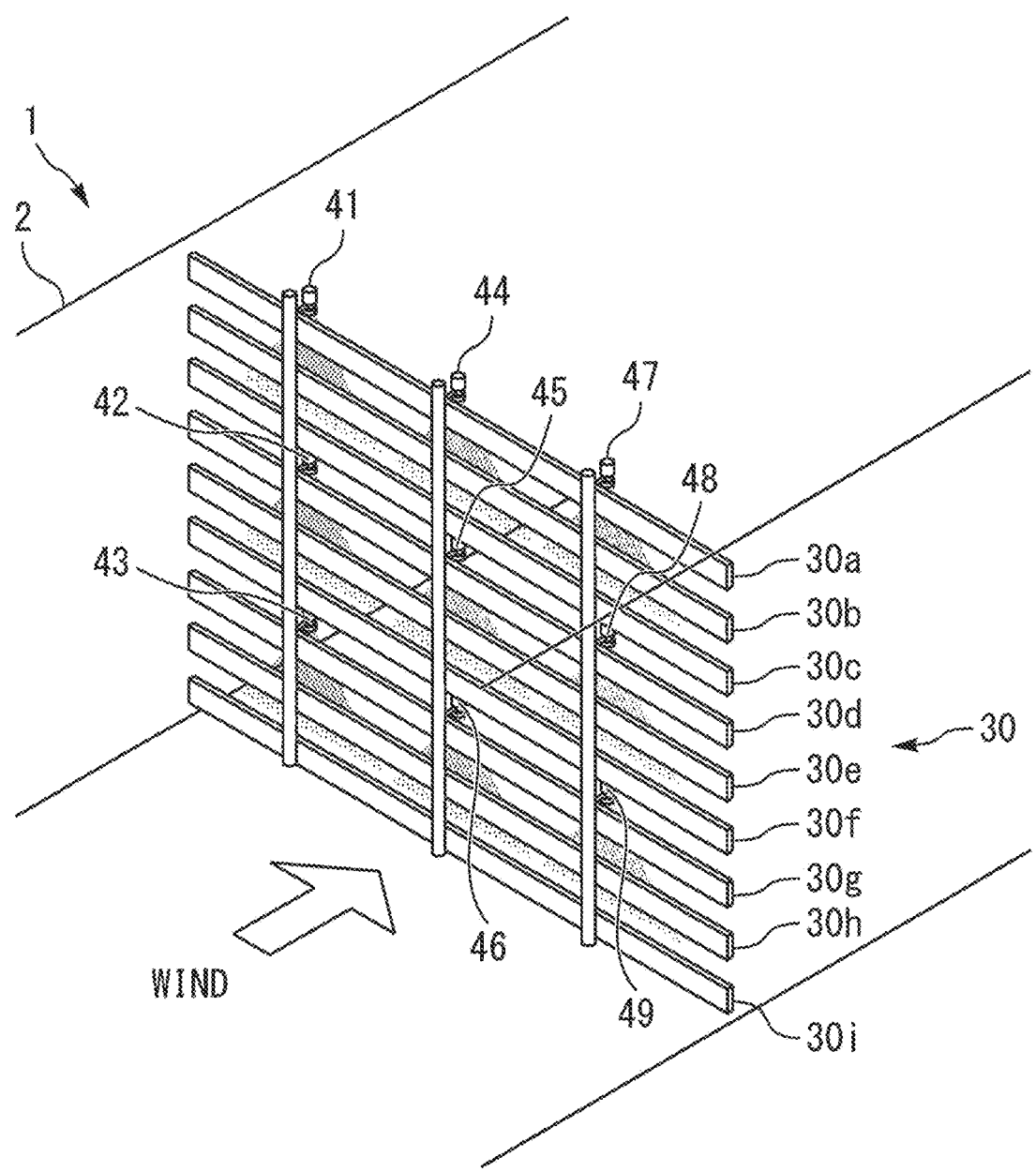
FIG. 9 is a perspective view of an air conditioner according to Embodiment 2.

FIG. 9 is a perspective view of the air conditioner 1 in which nine spray nozzles are arranged. An agitating plate group 30 is configured by arranging nine agitating plates (30a to 30i) in parallel at intervals over the entire cross-section of the duct 2. The nine spray nozzles (41 to 49) are arranged in three longitudinal columns and three traverse rows immediately downstream of the agitating plate group 30, and spray water particles in the direction perpendicular to the flow direction of the duct 2.

Figure 10:
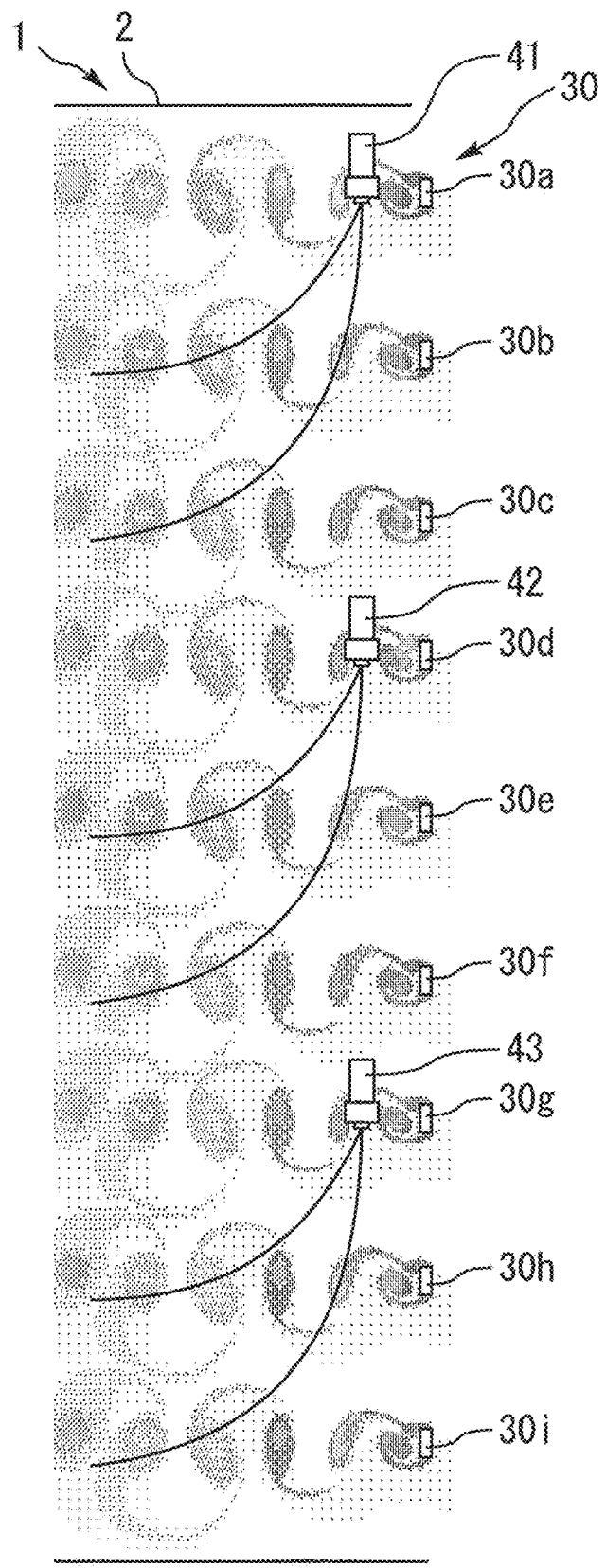
FIG. 10 is a side view of the air conditioner according to Embodiment 2.

As illustrated in FIG. 10, as viewed in the flow direction of the duct 2, the spray nozzle 41 sprays water particles with spray force at which the spray range covers the plurality of agitating plates (30a to 30c) of the agitating plate group 30. Likewise, as viewed in the flow direction of the duct 2, the spray nozzle 42 sprays water particles with spray force at which the spray range covers the plurality of agitating plates (30d to 30f). Likewise, as viewed in the flow direction of the duct 2, the spray nozzle 43 sprays water particles with spray force at which the spray range covers the plurality of agitating plates (30g to 30i). Note that this is true of the other spray nozzles (44 to 46 and 47 to 49). The configuration of the air conditioner 1 according to the present embodiment is similar to the configuration according to Embodiment 1 except that the number of agitating plates and the number of spray nozzles are increased in the present embodiment, and achieves the same action effects. Therefore, description of the configuration is omitted. Note that the number of agitating plates and the number of spray nozzles are not limited to the example in FIG. 9 and FIG. 10.

As described above, the air conditioner 1 can be applied to various installation spaces by changing the number of agitating plates and the number of spray nozzles based on the dimension of the duct 2.

Embodiment 3

Next, Embodiment 3 according to the present invention is described with reference to FIG. 11. In a site where the air conditioner 1 is installed, it is desirable to confirm a generation status of invisible Karman vortex in order to adjust the plate width and the interval in the agitating plate group.

Figure 11:
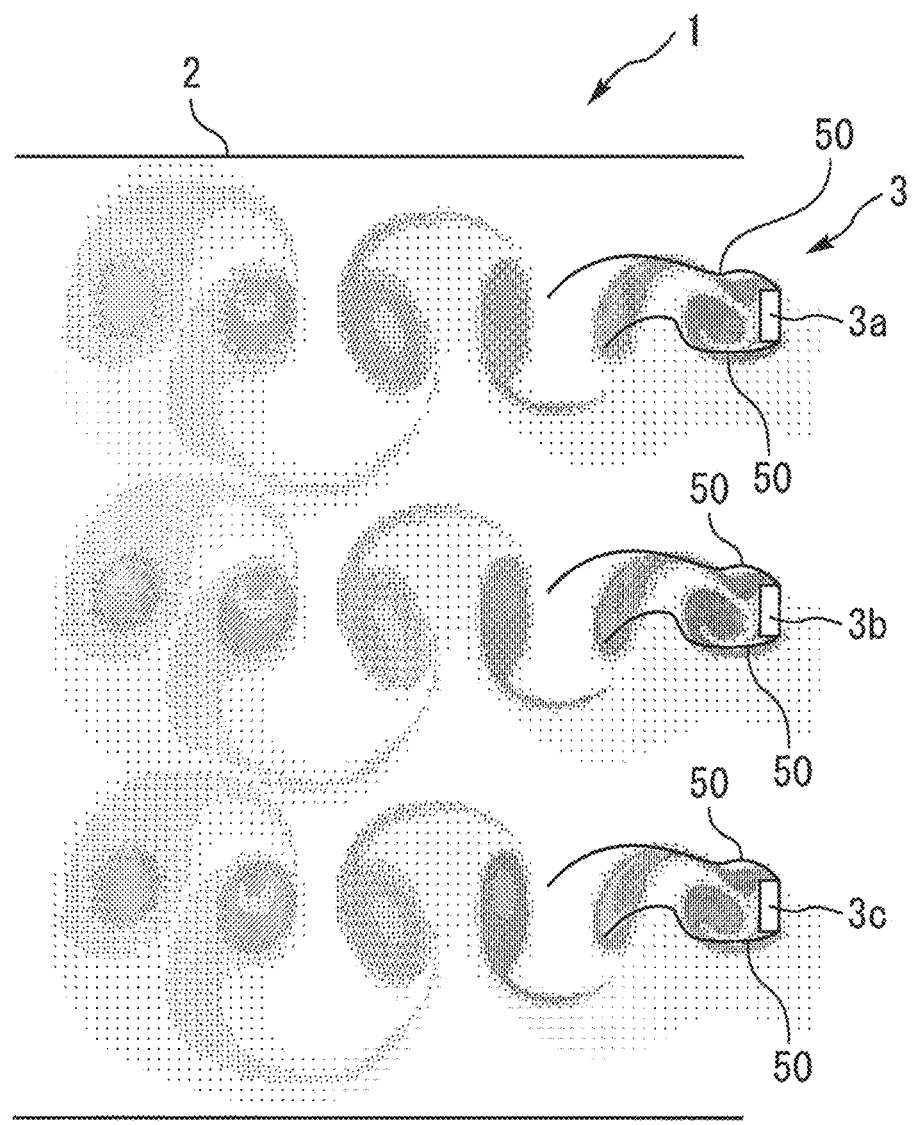
FIG. 11 is a diagram illustrating the air conditioner including equipment that enables confirmation of a generation status of a Karman vortex.

FIG. 11 is a diagram illustrating the air conditioner 1 including equipment that enables confirm of the generation status of the Karman vortex. A sheet-like vortex confirmation member 50 that bends to the airflow is attached to an upper part and a lower part of each of the agitating plates (3a to 3c). As a result, the generation status of the Karman vortex can be visually confirmed. Even in a case where complicated airflow occurs due to the installation environment of the air conditioner 1, it is possible to rapidly and surely confirm the generation status of the Karman vortex.

Although the embodiments of the present invention have been described above, the present invention is not limited to the above-described embodiments, and various modifications can be made without departing from the scope of the present invention.

REFERENCE SIGNS LIST

1 Air conditioner
2 Duct
3 Agitating plate group
3a to 3c Agitating plate
4 Spray nozzle
5 Fluid supply pipe
9 Water particle scattering/agitation range
10a, 12a Water particle scattering range
10b, 12b Water particle non-scattering range
11 Throttle plate
30 Agitating plate group
30a to 30i Agitating plate
40 Steam spray nozzle
41 to 49 Spray nozzle
50 Vortex confirmation member

The invention claimed is:

1. An air conditioner, comprising:
   a flow path through which air to be humidified flows;
   an agitating plate group in which agitating plates are arranged in parallel at intervals over an entire cross-section of the flow path, each of the agitating plates having a plate width selected to cause a vortex flow downstream; and
   a spray nozzle disposed immediately downstream of the agitating plate group, and configured to spray water particles in a direction perpendicular to a flow direction of the flow path,
   wherein the spray nozzle sprays the water particles with spray force at which a spray range covers a plurality of agitating plates of the agitating plate group as viewed in the flow direction of the flow path.

2. The air conditioner according to claim 1, wherein the plate width of each of the agitating plates is selected to satisfy a range of a Reynolds number causing a Karman vortex within a range of used wind speeds.

3. The air conditioner according to claim 2, wherein the plate width of each of the agitating plates is selected to correspond to an upper limit of the range of the Reynolds number, at a maximum wind speed within the range of used wind speeds.

4. The air conditioner according to claim 1, wherein the spray nozzle is a two-fluid nozzle that sprays and atomizes two fluids of air and water vertically downward, or a one-fluid nozzle that sprays only water.

5. The air conditioner according to claim 1, wherein the plate width of each of the agitating plates is changeable.

6. The air conditioner according to claim 1, wherein each of the agitating plates is a perforated plate.

7. The air conditioner according to claim 1, further comprising a sheet-like vortex confirmation member that is attached to each of the agitating plates and bends to airflow.

* * * * *